United States Patent
Bernard et al.

(10) Patent No.: US 8,946,314 B2
(45) Date of Patent: Feb. 3, 2015

(54) EXPANDABLE POLYAMIDE COMPOSITION AND POLYAMIDE FOAM OBTAINED THEREFROM

(75) Inventors: Jean-marie Bernard, Saint Laurent d'Agny (FR); François Briois, Croix-en-Ternois (FR); Eric Roche, Luzinay (FR)

(73) Assignee: Rhodia Polyamide Intermediates, Saint Fons (FR)

( * ) Notice: Subject to any disclaimer, the term of this patent is extended or adjusted under 35 U.S.C. 154(b) by 806 days.

(21) Appl. No.: 10/518,448

(22) PCT Filed: Jun. 20, 2003

(86) PCT No.: PCT/FR03/01900
§ 371 (c)(1),
(2), (4) Date: Jun. 23, 2005

(87) PCT Pub. No.: WO04/000908
PCT Pub. Date: Dec. 31, 2003

(65) Prior Publication Data
US 2006/0167124 A1 Jul. 27, 2006

(30) Foreign Application Priority Data
Jun. 21, 2002 (FR) .................................. 02 07714

(51) Int. Cl.
| | |
|---|---|
| C08G 18/00 | (2006.01) |
| C08F 283/04 | (2006.01) |
| C08J 9/00 | (2006.01) |
| C08G 18/28 | (2006.01) |
| C08G 18/60 | (2006.01) |
| C08J 9/02 | (2006.01) |

(52) U.S. Cl.
CPC ............. C08J 9/0061 (2013.01); C08G 18/281 (2013.01); C08G 18/60 (2013.01); C08J 9/02 (2013.01); C08J 2377/00 (2013.01); C08J 2475/00 (2013.01)
USPC .......................................... 521/155; 525/454

(58) Field of Classification Search
USPC ........ 528/339.5, 339.6; 521/50, 155; 525/424
See application file for complete search history.

(56) References Cited

U.S. PATENT DOCUMENTS

| | | | | |
|---|---|---|---|---|
| 2,995,531 | A * | 8/1961 | Hudson | 524/300 |
| 3,639,649 | A * | 2/1972 | McGrath et al. | 521/85 |
| 4,028,287 | A * | 6/1977 | Sato et al. | 521/110 |
| 4,374,976 | A * | 2/1983 | Blount | 528/339.5 |
| 4,444,816 | A * | 4/1984 | Richards et al. | 428/34.9 |
| 4,909,915 | A * | 3/1990 | Bederke et al. | 204/489 |
| 5,025,039 | A | 6/1991 | Neuhaus et al. | |
| 5,760,147 | A * | 6/1998 | Schonfeld et al. | 525/535 |
| 5,817,425 | A * | 10/1998 | Morishige et al. | 428/475.2 |
| 5,891,563 | A * | 4/1999 | Letts | 428/318.4 |
| 5,959,069 | A * | 9/1999 | Gluck et al. | 528/332 |
| 6,867,256 | B1 * | 3/2005 | Di Silvestro et al. | 524/606 |
| 6,872,800 | B1 * | 3/2005 | Bouquerel et al. | 528/310 |
| 2003/0173707 | A1 * | 9/2003 | Becker et al. | 264/272.11 |

FOREIGN PATENT DOCUMENTS

| | | | | |
|---|---|---|---|---|
| EP | 0 372 292 A2 | 6/1990 | | |
| EP | 0 409 599 A2 | 1/1991 | | |
| EP | 0 449 419 A1 | 2/1991 | | |
| EP | 0 424 548 A1 | 5/1991 | | |
| GB | 950876 | 2/1964 | | |
| WO | WO 9903909 A1 * | 1/1999 | ............. | C08G 69/00 |
| WO | WO 00/68298 A1 * | 11/2000 | ............. | C08G 83/00 |

OTHER PUBLICATIONS

Machine translation of EP 0424548 (published Feb. 1991).*
Ionescu, Mihail. Chemistry and Technology of Polyols for Polyurethanes, Dec. 2008, Smithers Rapra Technology, pp. 13-15.*
International Search Report issued on Oct. 30, 2003 by the European Patent Office in corresponding International Patent Application No. PCT/FR03/01900, and an English language translation of the Search Report.

* cited by examiner

*Primary Examiner* — Melissa Rioja
(74) *Attorney, Agent, or Firm* — Dentons US LLP

(57) ABSTRACT

The present invention relates to an expandable polyamide composition and to a polyamide foam obtained therefrom. This composition comprises a compound comprising at least one isocyanate function, a polyamide and a compound comprising at least one carboxylic acid function. The invention also relates to a process for preparing a polyamide foam from this composition.

26 Claims, 1 Drawing Sheet

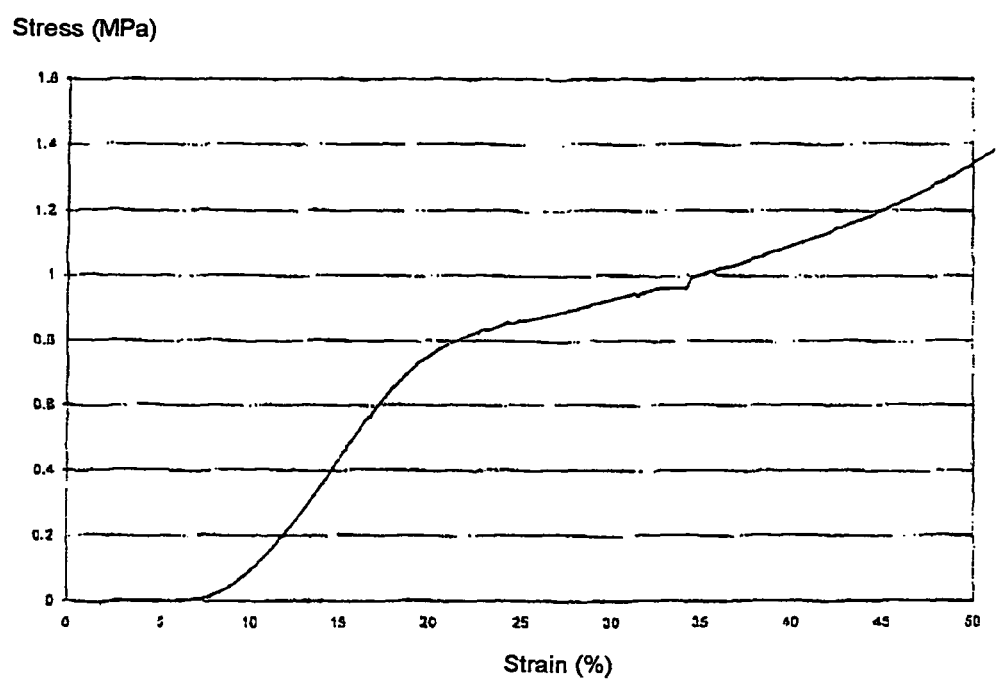

EXPANDABLE POLYAMIDE COMPOSITION AND POLYAMIDE FOAM OBTAINED THEREFROM

This application is an application under 35 U.S.C. Section 371 of International Application Number PCT/FR2003/001900 filed on Jun. 21, 2003.

The present invention relates to an expandable polyamide composition and to a polyamide foam obtained therefrom, and also to a process for obtaining the foam.

Synthetic foams are used in many fields, such as heat or sound insulation, motor vehicle trim, etc.

Two types of foam are essentially distinguished: structural foams and non-structural foams.

Structural foams are rigid foams composed of a low-density core and a skin whose density is close to that of the polymer of which the matrix is composed. These foams may be used as lightened structures in aeronautics or in the motor vehicle industry, for example.

Non-structural foams may be flexible or rigid. The rigid foams are used in the field of heat insulation (the gas present in the cells acting as the insulating agent). The flexible foams are used in the fields of furnishing and motor vehicle trim, for their compressibility and dampening properties, in the packaging field on account of their low weight, and also in the sound insulation field (foams with an open porosity have the particular feature of absorbing certain frequencies).

Various methods are known for obtaining thermoplastic polymer foams, such as polystyrene, PVC, polyethylene, polypropylene, etc. foams.

It is known practice to inject pressurized gases into the polymer melt.

It is also known practice to incorporate pore-forming agents—heat-unstable fillers—into the polymer melt, which release a gas during their decomposition. This method is occasionally difficult to control and the cells generated may then be of irregular size.

It is also possible to introduce into the polymer melt compounds dissolved in the melt, the foam being obtained by volatilizing these compounds.

Finally, it is known practice to obtain foams by means of a chemical reaction that releases gas, for instance carbon dioxide. This is the case, for example, for the polyurethane foams obtained by reaction between isocyanates, polyols and water, leading to the formation of polyurethane with release of carbon dioxide.

Polyamide foams may also be obtained chemically, by placing in contact isocyanates and lactams, and also bases to activate the anionic polymerization.

The present invention proposes another chemical route for producing polyamide foams, using an expandable composition including a compound comprising at least one isocyanate function, a polyamide and a compound comprising at least one acid function. The composition and the foam are simple to prepare, the foam being obtained in situ without the need to introduce external compounds, and directly from the composition. The process for preparing the foam makes it possible especially to control the foaming reaction. This process is also flexible: specifically, foams of diverse and varied nature and properties may be readily obtained by this process, especially by appropriately selecting the nature and characteristics of the polyamide of the composition.

In a first subject, the invention proposes an expandable composition comprising at least the following compounds:
A: a compound comprising at least one isocyanate function
B: a polyamide
C: a compound comprising at least one acid function, preferably a carboxylic acid function.

In a second subject, the invention proposes a process for preparing a polyamide foam from an expandable composition as described above, including at least the following steps:
a) heating the composition to a temperature of at least 80° C.
b) stabilizing the alveolar structure obtained.

Finally, the invention proposes a polyamide foam obtained from the process described above.

The term "acid function" means any acid function that can, by reaction with an isocyanate function, allow the release of gas, generally carbon dioxide; for example, mention may be made of carboxylic acid, phosphoric acid, sulphonic acid, etc. functions. However, carboxylic acid functions are preferred. The term "acid function" also means functions derived from the acid function, such as the acid anhydride, acid chloride, ester, etc. function. These derived functions lead either directly to a release of gas, generally of carbon dioxide, by reaction with the isocyanate function under hot conditions, or indirectly after reaction of the derived functions with a compound that regenerates the acid function; as examples of derived functions that can lead to a release of gas indirectly, mention may be made of the acid chloride function or the carboxylic acid anhydride function, for which the carboxylic acid function may be regenerated by reaction with water.

Compound C of the composition comprises at least one acid function. The polyamide B of the invention also generally comprises carboxylic acid functions; these functions may be present at the ends of the polyamide and/or distributed along the polyamide chain. The acid functions along the polyamide chain may especially be introduced into the polycondensation using a comonomer such as an amino diacid, for example, or by functionalization, for example, of the amide bonds by reaction especially with an acid aldehyde.

Compound A may also comprise acid functions, especially carboxylic acid functions.

These carboxylic acid functions are capable of reacting with the isocyanate functions of compound A according to the following reaction:

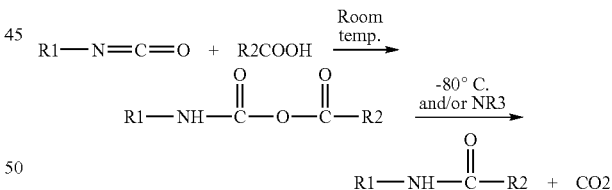

In general, the expandable composition of the invention comprises a respective amount of acid functions and of isocyanate functions that is adapted to the desired release of gas, especially of carbon dioxide, and thus to the foam density that it is desired to obtain from the expandable composition.

The acid functions may be borne by compound C alone, by the polyamide B alone, by compound A alone, by any two of these compounds A, B and C, or by the three compounds A, B and C.

The case in which the acid functions are borne by the polyamide alone corresponds to a particular embodiment of the invention in which compound C is the polyamide B.

The case in which the acid functions are borne by compound A alone corresponds to another particular embodiment of the invention in which compound C is compound A.

Polyamide B of the invention is a polyamide of the type obtained by polycondensation using dicarboxylic acids and diamines, or of the type obtained by polycondensation of lactams and/or amino acids. Polyamide B of the invention may be a mixture of polyamides of different types and/or of the same type, and/or copolymers obtained from different monomers corresponding to the same type and/or to different types of polyamide.

According to one preferred embodiment of the invention, the polyamide has a number of moles of acid functions that is greater than the number of moles of amine functions, and this case is generally referred to as being that of a polyamide with an excess of acid end groups.

Polyamide B of the invention may be an oligomer. The number-average molecular mass of the polyamide of the invention is advantageously greater than or equal to 1000 g/mol and preferably greater than or equal to 3000 g/mol.

As examples of polyamides that may be suitable for the invention, mention may be made of polyamide 6, polyamide 6,6, polyamide 11, polyamide 12, polyamides 4,6; 6,10; 6,12; 12,12; 6,36; semiaromatic polyamides, polyphthalamides obtained from terephthalic acid and/or isophthalic acid, such as the polyamide sold under the trade name Amodel, and copolymers and alloys thereof.

According to one preferred embodiment of the invention, the polyamide is chosen from polyamide 6 and polyamide 6,6, and blends and copolymers thereof.

According to one particular variant of the invention, the polyamide of the invention is a linear polyamide.

According to another particular variant of the invention, the polyamide of the invention comprises starburst or H-shaped macromolecular chains and, where appropriate, linear macromolecular chains. Polymers comprising such starburst or H-shaped macromolecular chains are described, for example, in documents FR 2 743 077, FR 2 779 730, U.S. Pat. No. 5,959,069, EP 0 632 703, EP 0 682 057 and EP 0 832 149.

According to another particular variant of the invention, the polyamide of the invention is a copolyamide with a random arborescent structure. These copolyamides of random arborescent structure and the process for obtaining them are described especially in document WO 99/03909.

The polyamide of the invention may also be a composition comprising a linear polyamide and a starburst, H-shaped and/or arborescent polyamide as described above.

The polyamide of the invention may also be a composition comprising a hyperbranched copolyamide of the type described in document WO 00/68298.

The polyamide may optionally include other functions such as ester and/or urea and/or carbonate and/or ether, etc. functions.

Compound A of the invention is a compound comprising at least one isocyanate function; it may be a blend of compounds comprising at least one isocyanate function.

According to one preferred embodiment of the invention, compound A is a polyisocyanate.

The term "polyisocyanate" means a compound comprising at least two isocyanate functions.

The polyisocyanate of the invention is preferably a polyisocyanate of formula (I) below:

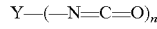
Y—(—N=C=O)$_n$ in which Y is a substituted or unsubstituted aromatic, aliphatic, cycloaliphatic or heterocyclic multivalent group optionally comprising hetero atoms and n is at least equal to 1. Examples of polyisocyanates that may be suitable are isophorone diisocyanate, 1,3- and 1,4-cyclohexane diisocyanate, 1,2-ethylene diisocyanate, 1,4-tetramethylene diisocyanate, 1,6-hexamethylene diisocyanate, 2,2,4- and 2,4,4-trimethyl-1,6-hexamethylene diisocyanate, 1,12-dodecane diisocyanate, α,α'-diisocyanatodipropyl ether, 1,3-cyclobutane diisocyanate, 2,2- and 2,6-diiso-cyanato-1-methylcyclohexane, 2,5- and 3,5-bis(iso-cyanatomethyl)-8-methyl-1,4-methanodecahydronaphthalene, 1,5-, 2,5-, 1,6- and 2,6-bis(isocyanatomethyl)-4,7-methanohexahydroindane, 1,5-, 2,5- and 2,6-bis(isocyanato)-4,7-methanohexahydroindane, 2,4'- and 4,4'-dicyclohexyl diisocyanate, 2,4- and 2,6-hexa-hydrotolylene diisocyanate, perhydro-2,4'- and 4,4'-diphenylmethane diisocyanate, α,α'-diisocyanato-1,4-diethylbenzene, 1,3- and 1,4-phenylene diisocyanate, 4,4'-diisocyanatobiphenyl, 4,4'-diisocyanato-3,3'-dichlorobiphenyl, 4,4'-diisocyanato-3,3'-dimethoxybiphenyl, 4,4'-diisocyanato-3,3'-dimethylbiphenyl, 4,4'-diisocyanato-3,3'-diphenylbiphenyl, 2,4'- and 4,4'-diisocyanatodiphenylmethane, 1,5-naphthylene diisocyanate, 2,4- and 2,6-tolylene diisocyanate, N,N'-(4, 4'-dimethyl-3,3'-diisocyanatodiphenyl)uretdione, m-xylylene diisocyanate, dicyclohexylmethane diisocyanate, tetramethylxylylene diisocyanate, 2,4,4'-triisocyanatodiphenyl ether, 4,4',4''-triisocyanatotriphenylmethane, and analogues and mixtures. Examples of such polyisocyanate oligomers that may be mentioned include isocyanurate trimers (HDI trimers) such as Tolonate HDT® from the company Rhodia and biurets such as Tolonate HDB® from the company Rhodia. Other examples of isocyanate oligomers are aliphatic isocyanate oligomers such as isophorone diisocyanate dimer or trimer, asymmetric hexamethylene diisocyanate trimer, and also hexamethylene diisocyanate derivatives of high functionality and low viscosity, and norbornene diisocyanate dimers and trimers.

According to one particular embodiment of the invention, the polyisocyanate is a mixture of polyisocyanate compounds with a mean functionality of between 2 and 8 (limits inclusive) and preferably with a functionality of between 3 and 7 (limits inclusive). The functionality is defined as being the number of isocyanate functions borne by each of the molecules of which the mixture is composed.

Examples of polyisocyanate mixtures that may be mentioned include isocyanurate trimers such as hexamethylene diisocyanate trimer (HDT) and isophorone diisocyanate trimer (IPDT) standards with a mean functionality of about 3.5.

Isocyanurate polyisocyanates of tolylene diisocyanate (TDI) or of methanediphenyl isocyanate (MDI) derivatives may also be used.

According to another preferred embodiment of the invention, the polyisocyanate is a diisocyanate, i.e. a polyisocyanate comprising two isocyanate functions, or a triisocyanate, i.e. a polyisocyanate comprising three isocyanate functions. The polyisocyanate is advantageously an isocyanurate.

Advantageously, compound A comprising at least one isocyanate function is other than a prepolymer or a polymer.

According to one particular embodiment of the invention, the isocyanate functions of compound A are totally or partially protected with a protecting group, generally covalently bonded to the isocyanate function. The protected polyisocyanate of the invention is preferably a polyisocyanate of formula (II) below:

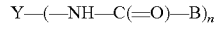
Y—(—NH—C(=O)—B)$_n$ in which B is the residue of the protecting group BH, Y and n having the same meaning as in formula (I) above.

As examples of protecting groups BH that may be suitable in the context of the invention, mention may be made of lactams such as caprolactam or dodecalactam; oximes such as 2-butanonoxime, pyruvatoxime, acetonoxime or benzophenoxime; optionally substituted heterocyclic compounds such as pyrazole, triazole, imidazole or benzotriazole derivatives or alkyl derivatives thereof such as dimethylpyrazole, methylpyrazole, dimethyltriazoles, and 2-ethyl- or -propylimidazole; alcohols or phenols and derivatives thereof, such as tert-butanol, methanol, ethanol or phenol, para- or ortho-hydroxybenzoic acids or the (cyclo)alkyl esters thereof, dialkyl malonates, hydroxamic acids, etc.

One particular case of protection of the isocyanate functions is the case of the uretidine diones, which consists of a self-protection of the isocyanate function.

The isocyanate functions may also be protected in the form of the N-acylurea by reacting the isocyanate functions with amide functions, the latter possibly being those of the polyamide.

Mixtures of protecting groups may be used in the context of the invention.

The protected polyisocyanates are liquid compounds or solid formulations. In general, these formulations contain no solvents.

The protecting groups of the invention are preferably lactams and more preferably caprolactam.

The polyisocyanate compounds may optionally comprise other functions such as urea and/or biuret and/or carbamate and/or allophanate and/or ester and/or carbonate and/or ether functions.

According to one preferred embodiment of the invention, the "deprotection" temperature of the isocyanate functions of compound A is greater than or equal to the melting point or softening point of polyamide B. In the context of the present invention, the "deprotection" temperature of the isocyanate functions of compound A is the temperature at which cleavage of the covalent bond between the protecting group and the isocyanate function is observed, and above which the isocyanate function is again free and reactive. The "deprotection" temperature of the isocyanate functions varies especially as a function of the nature of the protecting group; the choice of the protecting group may thus be adapted, for example, to the melting point of the polyamide B chosen for the composition. The softening point of the polyamide is the temperature at and above which the polyamide is deformed when a given stress is applied thereto.

The protection of the isocyanate functions of compound A is generally performed before preparing the composition of the invention. However, it may also be performed during the preparation of the composition of the invention, for example by introducing the protecting group at the moment when the constituents of the composition are placed in contact.

For the purposes of the invention, the expression "isocyanate function of compound A" means both the isocyanate functions protected with a protecting group and the unprotected isocyanate functions. For example, when reference is made to the number of moles of isocyanate functions of compound A, if these functions are protected with a protecting group or a mixture of protecting groups, this will be the number of moles of protected isocyanate functions.

Compound C comprising at least one acid function is preferably a polyacid, i.e. a compound comprising at least two acid functions. Mixtures of different compounds C may be used.

Compound C may also be a compound comprising an acid function and another function, which is reactive with the carboxylic or amine function of the polyamide. Examples of reactive functions that may thus be mentioned include primary or secondary amine, alcohol, sulphydryl, etc. functions. An example of such a compound C that may be mentioned is citric acid. The reactive functions that are preferred are primary or secondary amine functions.

Compound C of the invention is preferably a dicarboxylic acid. Examples of dicarboxylic acids that may be mentioned include adipic acid, dodecanedioic acid, terephthalic acid, etc.

The expandable composition of the invention may also comprise, besides compounds A, B and C, pore-forming agents that will allow the foaming phenomenon to be amplified during the preparation of the foam from the composition. Such pore-forming agents are known to those skilled in the art.

The expandable composition of the invention may also comprise other additives that are useful for the subsequent preparation of the foam, such as surfactants, nucleating agents, for instance talc, plasticizers, etc. These additives are known to those skilled in the art.

The composition may also comprise reinforcing fillers such as glass fibres, matting agents such as titanium dioxide or zinc sulphide, pigments, colorants, heat stabilizers, light stabilizers, bioactive agents, antisoiling agents, antistatic agents, flame retardants, high-density or low-density fillers, etc. This list is not in any way exhaustive.

Any method known to those skilled in the art for preparing a composition may be used to prepare the composition of the invention, comprising compounds A, B and C. For example, an intimate mixture of the powders of the various compounds may be prepared. It is also possible to introduce compounds A and C into the polyamide B melt. The mixing may be performed, for example, in an extrusion device. Polyamide B may also be in the form of granules, which may be coated with compounds A and C. Another method for preparing the composition that is suitable in the context of the invention is slurrying of the various compounds.

When the composition is prepared using an extrusion device, for example, the composition may then be shaped into granules. These granules may then be used without further modification or, for example, may be ground in the form of powder—of suitable particle size—prior to preparing the foam from the expandable composition. The particle size of the composition in powder form is advantageously less than or equal to 1 mm and preferably less than or equal to 500 μm.

The composition of the invention may also be in or may be brought into liquid or gel form, for example, using any means known to those skilled in the art.

When the isocyanate functions of compound A are protected with a protecting group, the working temperature during the preparation of the composition is preferably less than the "deprotection" temperature of the isocyanate functions.

In a second subject, the invention relates to a process for preparing a polyamide foam from an expandable composition as described above, including at least the following steps:

a) heating the composition to a temperature of at least 80° C.

b) stabilizing the alveolar structure obtained.

The temperature of step a) must be sufficient for there to be reaction between the isocyanate functions and the carboxylic acid functions of the composition, and also a release of gas, generally of carbon dioxide, and the formation of an alveolar structure. The temperature and kinetics of the decarboxylation reaction are dependent on the nature of the various constituents of the foam, i.e. the compounds A, B and C, and on the presence or absence of catalysts. In general, this temperature is at least 80° C.

According to one particular embodiment of the invention, the temperature during step a) is greater than the melting point or softening point of the polyamide B.

Step a) is generally performed in the melt. An extrusion device may be used during this step.

The duration of step a) varies as a function of the device used. A catalyst or a mixture of catalysts may be used during this step.

A catalyst may be used, for example, to accelerate the deprotection kinetics or to lower the deprotection temperature of the isocyanate functions of compound A. Examples of catalysts that may be mentioned include metal derivatives such as tin derivatives (such as dibutyltin dilaurate), zinc derivatives (such as zinc octoate) and bismuth derivatives, and tertiary amines such as diazabicyclooctane (DABCO) and diazabicycloundecene (DBU). Another catalyst may be used to accelerate the decarboxylation reaction of the carbamic anhydride and of the acid obtained by reacting the acid function with the isocyanate function; examples that may be mentioned include tertiary amines such as diazabicyclooctane (DABCO), diazabicycloundecene (DBU) and triethylamine.

The preparation of the composition of the invention and the preparation of the foam from this composition may be performed simultaneously. They may be performed in identical reactors, such as an extrusion device.

When the isocyanate functions of compound A of the expandable composition are protected, the temperature of step a) is greater than or equal to the "deprotection" temperature of the isocyanate function of compound A.

Pore-forming agents may be introduced during step a), along with surfactants, nucleating agents, for instance talc, plasticizers, etc.

Other compounds may also be introduced during step a), such as reinforcing fillers, for instance glass fibres, matting agents, for instance titanium dioxide or zinc sulphide, pigments, colorants, heat stabilizers, light stabilizers, bioactive agents, antisoiling agents, antistatic agents, flame retardants, etc. This list is in no way exhaustive.

Step b) of stabilizing the alveolar structure may be obtained, for example chemically—by crosslinking the polyamide—and/or physically—for example by cooling to a temperature lower than or equal to the glass transition temperature or the melting point of the polyamide. The crosslinking of the polyamide may be performed using crosslinking agents known to those skilled in the art. These are generally compounds comprising at least two functions that are reactive with the acid and/or amine functions of the polyamide. Generally, these compounds comprise at least three reactive functions. Examples of crosslinking agents that may be mentioned include carbonylbislactams such as carbonylbiscaprolactam, bisoxazine and bisoxazoline. These crosslinking agents are preferably introduced during the preparation of the composition to be expanded.

The foam structure obtained may be shaped into granules that may or may not be subsequently melted, or shaped by moulding, for example.

Finally, the invention relates to polyamide foams obtained by the process described above. The foams obtained according to this process advantageously have a mass per unit volume of less than or equal to 0.5 g/cm³ and preferably less than or equal to 0.3 g/cm³.

Other details or advantages of the invention will emerge more clearly in the light of the examples, which are given below purely for indicative purposes.

EXAMPLES

Compounds used

Compound B1: copolyamide 6/6,6 (60/40) with an excess of acid end groups (CEG [carboxy end groups]=480 meq/kg), with a relative viscosity measured in 90% formic acid at 25° C. of 33 ml/g Compound B2: copolyamide 6/6,6 (60/40) with a relative viscosity measured in 90% formic acid at 25° C. of 120 ml/g Compound B3: copolyamide 6/6,6 (60/40) with a relative viscosity measured in 90% formic acid at 25° C. of 140 ml/g Compound B4: copolyamide 6/6,6 (60/40) with an excess of acid end groups (CEG=1200 meq/kg)

Compound A1: isophorone diisocyanate trimer (IPDT), the isocyanate functions of which are protected with ε-caprolactam, with an isocyanate function titre of 3200 meq/kg Compound A2: mixture of isophorone diisocyanate (IPDI) and isophorone diisocyanate trimer (IPDT), the isocyanate functions of which are protected with ε-caprolactam, sold by the company Bayer under the reference Crelan LS2256®

Compound D1: talc (magnesium silicate) sold by the company Luzenac Europe under the reference Mistron Vapor RP6®, with a particle size of 7 μm Compound D2: silica sold by the company Rhodia under the reference Tixosil 365® and with a mean particle size of 3.5 μm Compound C: adipic acid sold by the company Rhodia.

The compositions prepared are detailed in Table 1. The proportions are indicated in weight percentages in the composition.

TABLE 1

| Compound | Composition E | Composition F | Composition G | Composition H | Composition J | Composition K |
|---|---|---|---|---|---|---|
| B1 | 85.8 | — | — | — | — | — |
| B2 | — | 83.3 | — | — | — | — |
| B3 | — | — | 83.3 | 58.6 | 57.1 | 57.1 |
| B4 | — | — | — | 26.3 | 26.3 | 26.3 |
| A1 | 12.9 | 12.9 | 12.9 | 15.1 | 15.1 | — |
| A2 | — | — | — | — | — | 15.1 |
| D1 | 1.3 | 1.5 | 1.5 | — | — | — |
| D2 | — | — | — | — | 1.5 | 1.5 |
| C | — | 2.4 | 2.4 | — | — | — |

Example 1

Composition E is obtained by mixing together the various compounds in a Brabender single-screw extruder, with a length/diameter ratio equal to 20. The extrusion conditions are as follows:

temperatures: 150-175-175-175° C.

flow rate: 2 kg/hour.

The extruded composition is cooled in water at room temperature. It has a density of 1.1. The composition is coarsely ground until a particle size of 1-2 mm is obtained.

3 g of this composition are placed in a Pyrex mould coated beforehand with mould-stripping agent. The mould is heated to a temperature of 190° C. for 30 minutes in a rotary heating oven. A specimen of rigid expanded polyamide with a density of 0.25 is thus obtained. The cellular distribution is of closed type. The cell size ranges between 0.1 and 1 mm in diameter.

For information, if composition E is replaced with compound A1 alone in Example 1, the density of the specimen obtained is 1.1.

Example 2

10 g of composition E as obtained in Example 1 (particle size 1-2 mm) are cryogenically ground until a powder with a mean particle size of 300 μm is obtained. 3 g of this composition are placed in a Pyrex mould coated beforehand with mould-stripping agent. The mould is heated to a temperature of 190° C. for 30 minutes in a rotary heating oven. A specimen of rigid expanded polyamide with a density of 0.2 is thus obtained. The cellular distribution is of closed type, and is fairly uniform. The cell size ranges between 0.1 and 0.2 mm in diameter.

Example 3

The various compounds of composition F are powder-blended and the blend obtained is then cryogenically ground until a powder with a particle size of less than 300 μm is obtained. Homogenization is performed during the grinding process.

3 g of this composition are then placed in a Pyrex mould coated beforehand with mould-stripping agent. The mould is heated to a temperature of 190° C. for 30 minutes in a rotary heating oven. A specimen of semi-rigid expanded polyamide with a density of 0.2 is thus obtained. The cellular distribution is of closed type, and is fairly uniform. The cell size ranges between 0.1 and 0.2 mm in diameter.

Example 4

The various compounds of composition F are powder-blended and the blend obtained is then cryogenically ground until a powder with a particle size of less than 300 μm is obtained. Homogenization is performed during the grinding process.

3 g of this composition are then placed in a Pyrex mould coated beforehand with mould-stripping agent. The mould is heated to a temperature of 190° C. for 40 minutes in a rotary heating oven. A specimen of semi-rigid expanded polyamide with a density of 0.15 is thus obtained. The cellular distribution is of closed type, and is fairly uniform. The cell size ranges between 0.1 and 0.2 mm in diameter.

Example 5

The various compounds of composition H are powder-blended and the blend obtained is then cryogenically ground until a powder with a particle size of less than 300 μm is obtained. Homogenization is performed during the grinding process.

3 g of this composition are then placed in a Pyrex mould coated beforehand with mould-stripping agent. The mould is heated to a temperature of 190° C. for 40 minutes in a rotary heating oven. A specimen of expanded polyamide with a density of 0.25 is thus obtained. The cellular distribution is of closed type, and is fairly uniform. The cell size ranges between 0.1 and 0.2 mm in diameter.

The Young's modulus of the specimen obtained is measured on a series of 4 cylindrical specimens 26.5 mm in diameter and 15.8 mm thick. The measurement is performed using an Instron 1185 machine under the following conditions:
Temperature: 23° C.
Relative humidity: 50%
Pull speed: 20 mm/min.
The stress-strain curve is recorded using this machine.
FIG. 1 shows the stress-displacement curve corresponding to the specimen of composition H.
The mean modulus measured is 43.4 MPa.

Example 6

Composition J is obtained by blending the various compounds in a Buss 46 co-kneader equipped with an embedded cutting head. The extrusion conditions are as follows:
temperatures: 175-170-160-155-155-140° C.
flow rate: 9 kg/hour.
"Ready-to-foam" polyamide beads 1.5 mm in diameter are thus obtained. These beads are then fed into a Billion Stabilog injection press equipped with a "plaque" mould 85×85×5 mm in size with central direct injection. The temperature profile on the heating elements is as follows: feed zone 165° C.-165° C.-190° C. The nozzle temperature is maintained at 240° C.

A plaque with a density of 0.45 (skin included) is obtained.

Example 7

Composition K is obtained by blending the various compounds in a Buss 46 co-kneader equipped with an embedded cutting head. The extrusion conditions are as follows:
temperatures: 175-170-160-155-155-140° C.
flow rate: 9 kg/hour.
"Ready-to-foam" polyamide beads 1.5 mm in diameter are thus obtained. These beads are then fed into a Billion Stabilog injection press equipped with a "plaque" mould 85×85×5 mm in size with central direct injection. The temperature profile on the heating elements is as follows: feed zone 165° C.-165° C.-190° C. The nozzle temperature is maintained at 240° C.

A plaque with a density of 0.45 (skin included) is obtained.

The invention claimed is:

1. An expandable polyimide composition comprising:
compound A: a compound having at least one isocyanate function protected with a protecting group; and
compound B: a polyamide; wherein the polyamide comprises a carboxylic acid function at least at two ends of a polyamide chain, and wherein the number of moles of acid functions of said polyamide is greater than the number of moles of the amine functions;
wherein when said composition is heated to a temperature of at least 80° C., compounds A and B of said composition react to form a foam, and said composition does not contain additional compounds that react to release a gas to produce the foam, wherein an amount of compound A and an amount of compound B, are selected to control the amount of gas released when the foam is produced, and wherein compound B is present in the composition in an amount greater than the amount of the compound having at least one isocyanate function.

2. The composition according to claim 1, wherein the polyamide is an oligomer or a polymer with a number-average molecular mass of greater than or equal to 1,000 g/mol.

3. The composition according to claim 1, wherein the polyamide is polyamide 6, polyamide 6,6, or blends and copolymers thereof, which are functionalized with carboxylic acid groups at both ends.

4. The composition according to claim 1, wherein the polyamide is a linear polyamide.

5. The composition according to claim 1, wherein the polyamide comprises starburst or H-shaped macromolecular chains.

6. The composition according to claim 1, wherein the polyamide is a copolyamide of random arborescent structure.

7. The composition according to claim 1, wherein the polyamide is a composition comprising a linear polyamide and a starburst and/or H-shaped and/or arborescent polyamide.

8. The composition according to claim 1, wherein the polyamide is a composition comprising a hyperbranched copolyamide.

9. The composition according to claim 1, wherein compound A is a polyisocyanate.

10. The composition according to claim 9, wherein the polyisocyanate is a polyisocyanate of formula (I):

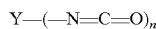

wherein Y is a substituted or unsubstituted aromatic, aliphatic, cycloaliphatic or heterocyclic multivalent group optionally comprising hetero atoms and n is at least equal to 1.

11. The composition according to claim 9, wherein the polyisocyanate is a diisocyanate or a triisooyanate.

12. The composition according to claim 9, wherein the polyisocyanate is an isocyanurate.

13. The composition according to claim 1, wherein compound A, the compound having at least one isocyanate function, is a compound other than a prepolymer or a polymer.

14. The composition according to claim 1, wherein the protecting group is a lectern, optionally caprolactam.

15. The composition according to claim 1, wherein the compound A has a deprotection temperature of the isocyanate functions greater than the melting point or softening point of polyamide B.

16. The composition according to claim 1, further comprising an additive selected from the group consisting of a pore-forming agent, a nucleating agent, a surfactant, a plasticizer, reinforcing fillers, matting agents, pigments, colorants, heat stabilizers, light stabilizers, bioactive agents, antisoiling agents, antistatic agents or flame retardants.

17. The composition of claim 1, wherein the polyamide is a polycondensate of dicarboxylic acids and diamines or a polycondensate of lactams and/or amino acids.

18. The composition of claim 1, wherein the poiyamide is present in the composition in an amount of at least 51% by weight of the total composition.

19. The composition according to claim 1, wherein the amount of the compound having at least one isocyanate function protected with a protecting group and the amount of the compound having at least one acid function are selected to control to control the density of the expanded foam formed from the composition.

20. A process for preparing a polyamide foam from an expandable polyamide composition, comprising the steps of:
   a) heating an expandable foam composition comprising:
      compound A: a compound having at least one isocyanate function protected with a protecting group; and
      compound B: a polyamide; wherein the polyamide comprises a carboxylic acid function at least at two ends of a polyamide chain, and wherein the number of moles of acid functions of said polyamide is greater than the number of moles of the amine functions:
      wherein said composition does not contain additional compounds that react to release a gas to produce the foam, wherein an amount of compound A and an amount of compound B are selected to control the amount of gas released when the foam is produced, and wherein compound B is present in the composition in an amount greater than the amount of the compound having at least one isocyanate function;
      to a temperature of at least 80° C. to obtain an alveolar structure,
   b) stabilizing the alveolar structure obtained in step a), and
   c) recovering the foam obtained in step b).

21. The process according to claim 20, wherein the temperature of step a) is greater than or equal to the melting point or softening point of the polyamide of the composition.

22. The process according to claim 20, wherein the temperature of step a) is greater than or equal to the deprotection temperature of the isocyanate functions of compound A.

23. The process according to claim 20, wherein an additive selected from the group consisting of a pore-forming agent, a nucleating agent, a surfactant, a plasticizer, a reinforcing filler, a matting agent, a pigment, a colorant, a heat stabilizer, a light stabilizer, a bioactive agent, an antisoiling agent, and an antistatic agent, is further added to the composition in step a).

24. The process according to claim 20, wherein the foam obtained in step c) has a mass per unit volume of less than or equal to 0.5 g/cm³.

25. The process according to claim 20, wherein the polyamide is a polycondensate of dicarboxylic acids and diamines or a polycondensate of lactams and/or amino acids.

26. The process of claim 20, wherein the polyamide is present in the composition in an amount of at least 51% by weight of the total composition.

* * * * *